Figure 1:
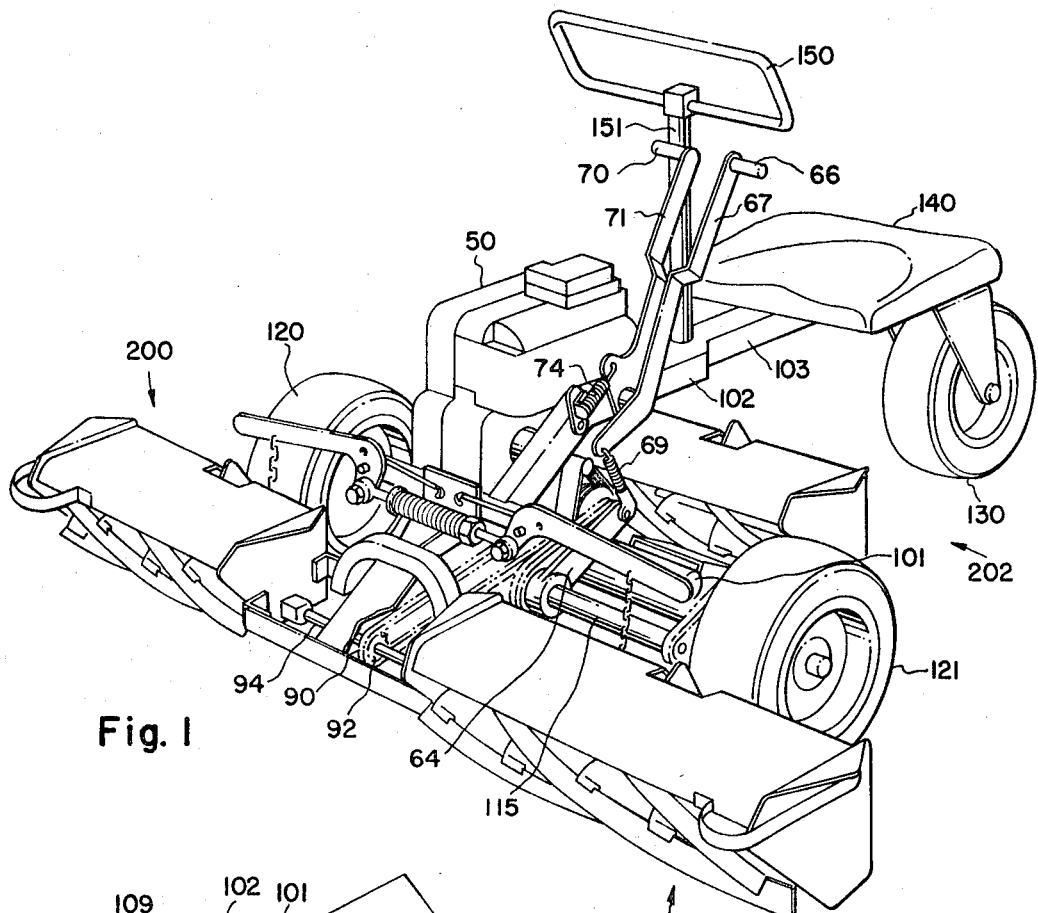

United States Patent
Speiser

[15] 3,651,702
[45] Mar. 28, 1972

[54] DRIVE MECHANISM

[72] Inventor: Ralph W. Speiser, Minneapolis, Minn.

[73] Assignee: Toro Manufacturing Corporation, Minneapolis, Minn.

[22] Filed: Oct. 17, 1968

[21] Appl. No.: 785,422

Related U.S. Application Data

[62] Division of Ser. No. 390,704, Aug. 19, 1964, Pat. No. 3,410,063.

[52] U.S. Cl. ............................................................74/203
[51] Int. Cl. ......................................................F16h 15/00
[58] Field of Search ....................56/7, 26, 249; 74/220, 203; 64/7

[56] References Cited

UNITED STATES PATENTS

| | | | |
|---|---|---|---|
| 2,224,309 | 12/1940 | Mack | 74/203 |
| 2,654,260 | 10/1953 | Lewis | 74/203 |
| 2,729,299 | 1/1956 | Rink | 74/203 X |
| 3,202,144 | 8/1965 | Nicholson | 74/203 X |

*Primary Examiner*—Milton Kaufman
*Attorney*—Vernon A. Johnson

[57] ABSTRACT

Drive mechanism for a riding mower in which the power for driving the traction wheels of the vehicle and for driving the cutting units is transmitted from a common engine shaft. The power to the wheels is transmitted through a reversible transmission involving a coplanar driving and driven pulleys rotating on parallel axes and movable into and out of engagement with each other and drivingly interconnected by a belt wrapped around both pulleys. When the pulleys are engaged with each other, the belt is slack, and the driven pulley is driven in one direction. When the pulleys are disengaged, the belt is tightened and drives the driven pulley in the opposite direction. The power to the cutting units is transmitted from the engine through an intermediate shaft which is rotatably mounted on the wheel axle. At least two of the cutting units are in alignment and driven by a common coaxial drive shaft driven from said intermediate shaft.

7 Claims, 6 Drawing Figures

INVENTOR.
RALPH W. SPEISER

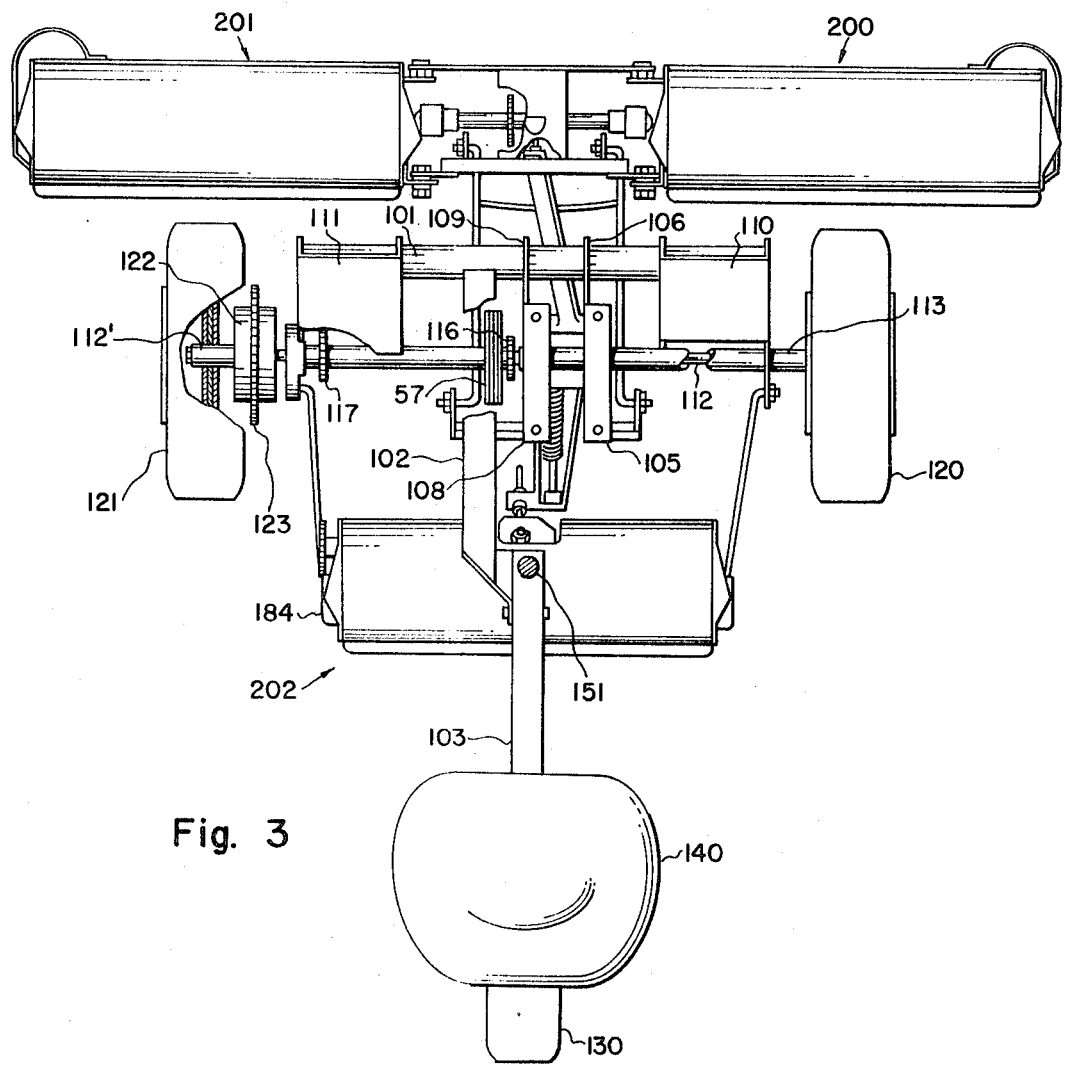
Fig. 3
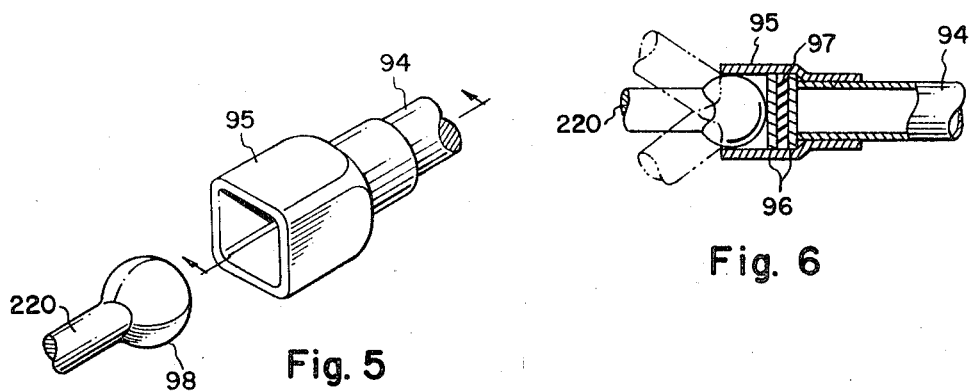
Fig. 5
Fig. 6
INVENTOR.
RALPH W. SPEISER
BY Thomas L. Lennon
ATTORNEY

DRIVE MECHANISM

This is a division of application Ser. No. 390,704, filed Aug. 19, 1964, now U.S. Pat. No. 3,410,063.

This invention relates to an improved multiple mowing unit traction mowing machine, and more particularly, to a machine in which the mowing units are grouped in overlapping relationship about a small and compact traction vehicle, and in which the mowing elements of each unit are operated from the power source on the traction vehicle, and especially to novel drive mechanism for powering the vehicle and the mowing unit.

Riding lawn mowers suitable for institutional, commercial, or park use, or for use on estates and the like where large expanses of grass are to be cut, are commonly in widespread use, and a plurality of tractor mounted reel mowers mounted in overlapping relation continues to provide a better answer for such uses.

Thus, it is the principal object of my invention to provide a riding vehicle and mower assembly, wherein several reel mowers are mounted in slightly overlapping relation to provide a wide-swath mowing configuration, and more particularly to provide a novel drive mechanism for powering such a vehicle and the mowers mounted thereon.

Figure 2:
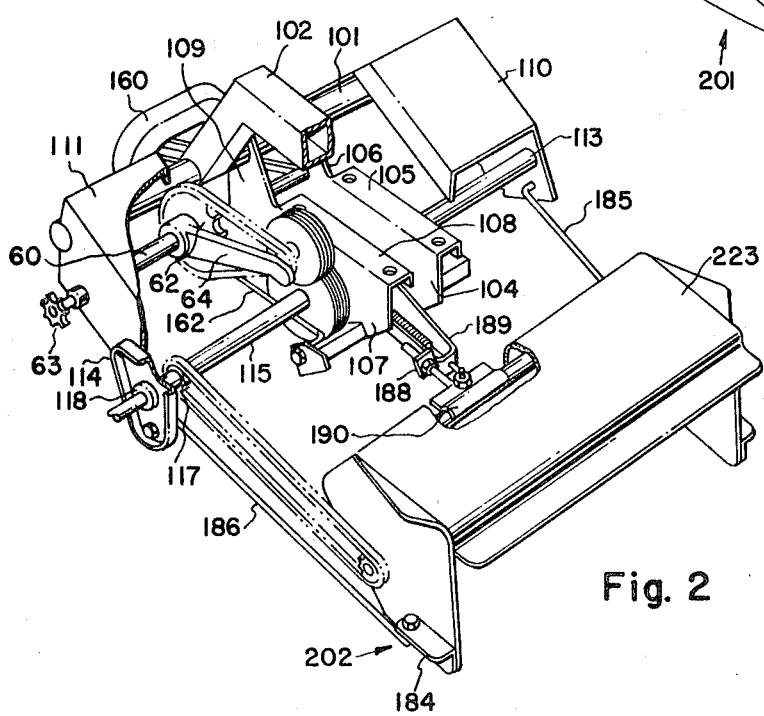
Figure 4:
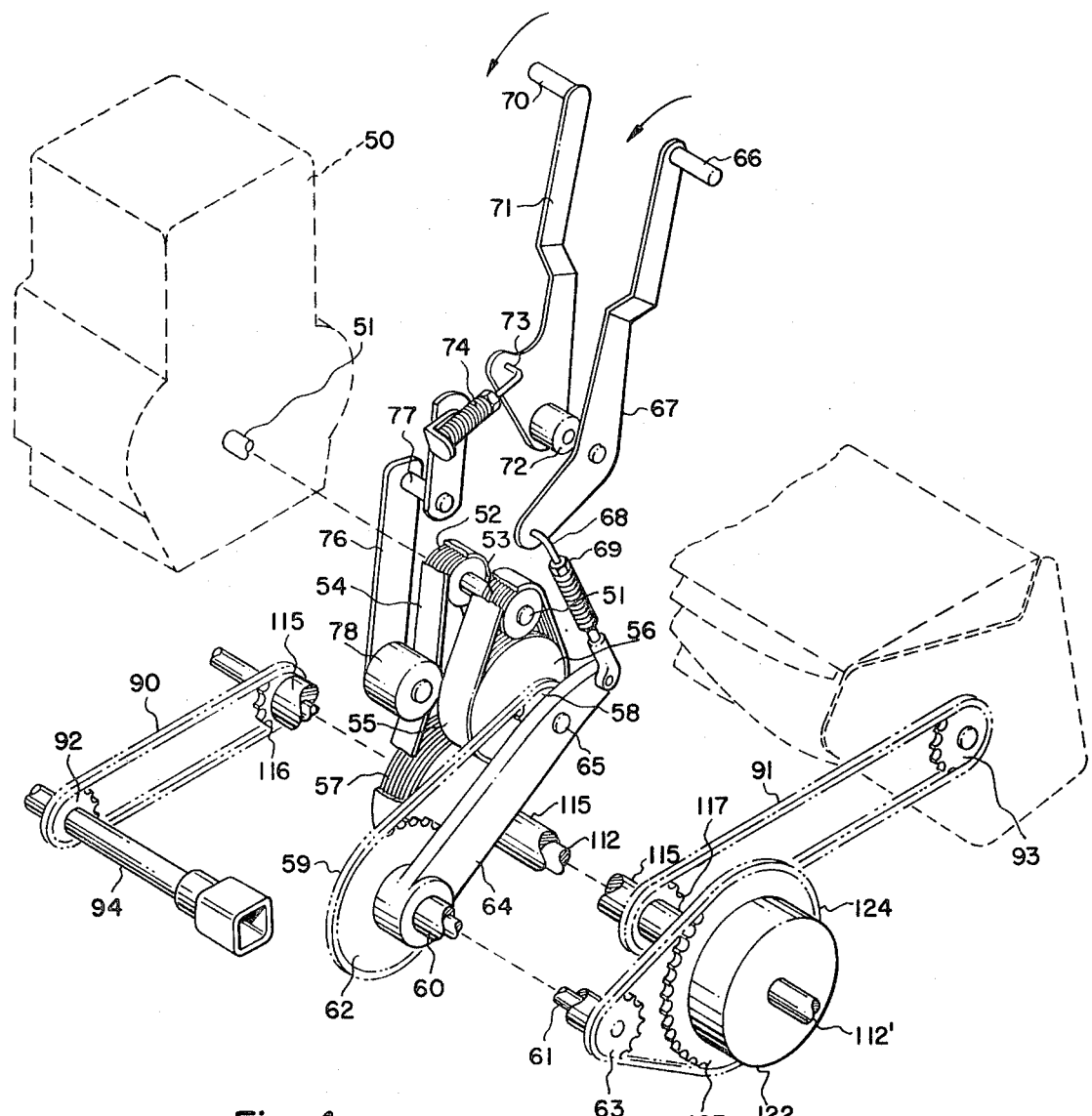

This and other objects of the invention will become apparent from a careful analysis of the specification and drawings, in which:

FIG. 1 is a perspective view of my overall machine, viewed from the left front corner, FIG. 2 is a perspective view of the internal frame structure of my mower, as viewed from the left rear corner, FIG. 3 is a top plan view of the basic supporting frame of my mower, FIG. 4 is an enlarged perspective view of the basic components in my transmission as viewed in FIG. 1, FIG. 5 is an exploded perspective view of my "square-ball" universal joint, FIG. 6 is a cross-sectional view of the universal joint shown in FIG. 5.

THE FRAME

The basic frame of my mower is best seen in FIGS. 1, 2, and 3, and, particularly, in FIGS. 2 and 3. A generally "T"-shaped main frame includes tubular cross member 101 and the base of the "T" consists of channel members 102 and 103 secured together by bolts or other suitable means as shown. The forward most portion of member 102 is downwardly curved as is best illustrated in FIG. 1 and welded at its forward end to cross member 101. The rearward end of member 103 is supported by wheel 130 and the operator's seat 140 is mounted thereabove. The forward end of member 103 is provided with a suitable bushing or bearing (not shown) to receive upstanding shaft 151 of the steering assembly. The steering wheel or handle 150 is mounted at the upper end of shaft 151.

The forward portion of the vehicle is supported on wheels 120 and 121, and axle-shaft assembly 112. The basic support for axle-shaft assembly 112 is provided by tubular cross member 101 through engine support members 104 and 107, and foot support members 110 and 111, all of which are securely welded to cross member 101. Engine support member 104 is provided with an upstanding front end portion 106, which surrounds cross member 101 and is securely welded thereto, and it is also provided with a horizontal portion 105, with holes through each end thereof, to serve as a support pad for the engine base. Similarly, engine support member 107 is provided with an upstanding member 109 secured to cross member 101 and with a horizontal portion 108 which cooperates with horizontal portion 105 of engine support member 104 to serve as the total support platform for the engine.

Foot support members 110 and 111 include a sloping upper surface which serves as a foot rest, and downwardly depending sides which are securely welded to cross member 101 at their forward ends. Axle-shaft assembly 112 is supported by members 110, 104, 107, and 111 as is most clearly seen in FIG. 2. Thus, it is clear that the axle-shaft assembly 112 and the wheels at either end thereof combine with wheel 130 to provide a steerable three-point support platform for the overall mower assembly.

Three reel-mower assemblies 200, 201, and 202, which are substantially similar to one another, are provided.

THE HITCHES

The several reel-mower units described above, are attached to the basic wheeled frame of the vehicle by means of specially designed hitches that are effective to permit relatively independent vertical movement of each mower unit so as to provide relatively uniform mowing over irregular turf. The hitches are also effective to maintain the bed-knife of each mower unit in the same attitude with respect to the ground, regardless of such vertical movement, to thereby assure a uniform height of cut over such irregular turf. These hitches will be best understood by reference to FIGS. 1, 2, 3.

This method of attachment permits substantially independent vertical movement of the two mower units 200 and 201 with respect to one another, while at the same time maintaining them in substantial lengthwise alignment as viewed from the top. Relative vertical movement occurs in the event that the inboard end of mower unit 201 encounters a hump in the mowing area, and relative movement occurs as the vehicle is moved along a ridge. The mower units can be completely removed from the ground and the front hitch is capable of permitting the mower units to assume a position that would permit mowing in a fairly narrow valley. Thus, substantial flexibility is achieved in a straight forward and simple manner.

The mower units 200 and 201 can be maintained in a position of coaxial alignment and both raised simultaneously. As this movement occurs, the upper edge of the mower end plate remains substantially horizontal.

THE TRANSMISSION

The transmission of automotive power from engine 50 to wheels 120 and 121, and to the driven reel shafts of reel mower units 200, 201, and 202, will be best understood from FIGS. 1, 2, 3, and 4. While shaft 112 is described in a general way above as being in support of the wheels of the vehicle, the actual details of this support are significant in connection with the transmission of energy to the wheels. Actually, the shaft 112 which may also be referred to as a fourth shaft does not extend the full width of the wheels, since the main shaft 112 ends at differential 122 (FIG. 3), and stub-shaft 112' extends from the other side of the differential into supporting engagement with wheel 121. Axle 112 is actually supported between sleeve 113 and bearing 118. Sleeve 113 is slightly larger than shaft 112, and is rigidly welded to the vertical side flanges of footrest 110 and the downward extending portions of engine support members 104 and 107. This sleeve actually ends just to the left of motor support member 107 (see FIG. 3), and a bushing is provided at each end of sleeve 113 so as to provide support for shaft 112 at those two points. A grease fitting (not shown) may be provided in sleeve 113 to permit proper lubrication of the cylindrical area between shaft 112 and sleeve 113.

Bearing 118 provides support for the other end of the shaft, and is rigidly mounted to bearing bracket 114, which is in turn welded to the downwardly extending left hand portion of footrest 111. Shaft 112 supports a sleeve 115 as shown, sleeve 115 which may also be referred to as a fifth shaft, being sized to fit loosely between the left end of sleeve 113 and bearing 118, and bushings are provided at each end of sleeve 115 to permit rotation of sleeve 115 with respect to shaft 112. A sprocket 116 which may also be referred to as a fifth driven member, is rigidly attached to the right end of sleeve 115, and a sprocket 117 is rigidly attached to sleeve 115 near the left end thereof. These sprockets are effective to transmit rotary driving force to the reel shafts as will be described hereinafter.

A grease fitting (not shown) may be provided in sleeve 115 to permit proper lubrication between sleeve 115 and shaft 112. Pulley 57 is also rigidly attached to sleeve 115, and is effective to transmit the energy from engine 50 to sleeve 115.

The left end of shaft 112 is keyed to the hub of differential 122, and stub-shaft 112' is rigidly attached at the center of wheel 121, and is keyed to the opposite hub of differential 122. A sprocket 123 which may also be referred to as a second driven member, forms an integral part of differential 122, and is effective when driven by a chain 124 which may also be referred to as a first endless flexible drive means, to cause simultaneous rotation of shaft 112 and 112'. However, as the vehicle is turned, differential 122 permits shafts 112 and 112' to turn at different rates of speed, in the usual manner.

An intermediate jack-shaft 61 may also be referred to as a third shaft is also provided, and is rotatably mounted in sleeve 60, which is rigidly welded across the downwardly extending sides of footrest 111 as is most clearly seen in FIG. 2. Bushings (not shown) are provided at either end of sleeve 60, and a grease fitting (not shown) may be provided as in the case of sleeves 113 and 115 to permit lubrication. Traction drive arm 64 is provided with a hub at its forward end, said hub being rotatably mounted on shaft 61 adjacent the right end of supporting sleeve 60, and is therefore rotatable on shaft 61 and independent of shaft rotation. Sprockets 62 and 63 (which may also be referred to as a first driven member), are keyed on either end of shaft 61, and are effective to provide two stages of speed reduction to the driven wheels.

The overall transmission of energy is most clearly seen in FIG. 4, which is drawn in schematic and exploded form, and generally from the same perspective as is seen in FIG. 1. However, the scale is considerably larger in FIG. 4.

Engine 50 is mounted on engine support members 104 and 107 as have been previously described, and is provided with a horizontal output shaft 51 which may also be referred to as a first shaft. Pulleys 52 and 53 are keyed to shaft 51, and are continuously rotating when the engine is running.

Pulley 52 which may also be referred to as a third driven member, supplies the energy for driving the reels, and this energy is carried by belt 54 to pulley 57 which may also be referred to as a fourth driven member, which in turn drives rotatable sleeve 115 on shaft 112. Sprockets 116 and 117 on sleeve 115 are thereby driven, and this energy is carried by chains 90 and 91, respectively, to sprockets 92, and 93, respectively. When the reels are disengaged, there is ordinarily enough slack in belt 54 to permit slippage of the belt with respect to pulley 52, and thereby prevent the transmission of energy to the reels. However, when handle 70 is moved to engage position in the direction of the arrow shown, link 71 pivots on pin 72 which is supported by member 102 of the main frame. Spring link 74 then causes idler pulley arm 76 to be rotated in a counterclockwise direction as viewed in FIG. 4, about pin 77, said pin 77 being securely mounted across the vehicle frame 102. Idler pulley 78 is thereby moved into engagement with belt 54, causing the rotation of pulley 57 and the transmission of rotary energy to the blades of the mowers. It should be noted that this linkage is provided with an over-center capability, in that movement of handle 70 to the full engaged position causes point 73 on link 71 to move below a straight line drawn between the axis of pin 72 and the forward end of spring link 74. The spring on link 74, which is slightly compressed as link 74 moves to the indicated line, is thereafter effective to hold arm 71 in such over-center position, and thereby hold the reels in operation, until a force is exerted on handle 70 to restore the linkage to its disengaged position.

The rearward end of arm 64 carries rigid stub shaft 65 which may also be referred to as a second shaft, pulley 56 and sprocket 58 being rotatably mounted thereon and fastened together so as to rotate at the same angular speed. Pulley 53 is effective to drive pulley 56 through belt 55, and thereby drive sprocket 62 through sprocket 58 and chain 59. This energy is then carried by shaft 61 to sprocket 63 which drives sprocket 123 through chain 124.

In order to achieve forward motion of the vehicle, handle 66 is moved in the direction as shown by the arrow in FIG. 4, thereby causing arm 67 (which may also be referred to as a second arm) to rotate in a counterclockwise direction about pin 72. Spring link 69 is then effective to force the rearward end of arm 64 and pulley 56 downwardly about pivotal axis 61, thereby causing belt 55 to be tightened against pulleys 53 and 56, and driving energy is then transmitted to the wheels in the manner described above. It should be noted that an over-center capability is also inherent in this linkage, since movement of handle 66 to the full forward position causes point 68 on spring link 69 to drop behind a line between the axis of pin 72 and at the rear of arm 64 to which link 69 is pivotally connected. Here again, a spring on link 69 is slightly compressed as link 64 moves to the indicated line, and is thereafter effective to hold arm 67 in this full forward position, making it unnecessary for the operator to hold handle 66 as he is normally mowing. It should also be noted that a three step speed reduction is accomplished by means of my transmission arrangement, one step from pulley 53 to pulley 56, and the second and third steps going to sprockets 62 and 123, respectively.

My novel arrangement of pulleys and sprockets also makes it very simple to reverse the vehicle, merely by pulling back on handle 66, which is normally provided with springs (not shown) to hold it in the neutral position. However, when handle 66 is pulled back against the force of the neutral spring, link 69 is moved upwardly thereby moving the rearward end of arm 64 and 56 upwardly moving pulley 56 into direct engagement with pulley 53 and causing pulley 56 to be rotated in the reverse direction. When this occurs, the wheels of the vehicle are obviously driven in the reverse direction. In this configuration, it should be noted that since shaft 65 and its supporting arm 64 move rotatably about shaft 61, the movement of pulley 56 to either the forward or reverse position does not effect a change in the center distance between sprockets 62 and 58, causing chain 59 to remain equally tight in either position.

It will be obvious that sprocket 93 is connected directly to the reel shaft of reel mower unit 202, and the energy transmitted by chain 91 is thereby effective to directly drive the reel of this mower. However, the drive for the front reels is somewhat different, and it will be noted that sprocket 92 is keyed to a intermediate shaft 94. Shaft 94 is effective to drive the shafts of both reel mower assemblies 200 and 201 through unique and simple universal coupling as is most clearly seen in FIGS. 5 and 6. A socket 95 is welded at either end of intermediate shaft 94. A specially shaped cubic flange 98, which has a regular square shape as viewed from the end, but having its four sides rounded so as to appear round when viewed from one side as in FIG. 6, is rigidly attached at the inner end of each reel shaft 220 of reel mower units 200 and 201. These square-ball flanges fit into sockets 95 at either end of shaft 94, and are effective to transmit rotary energy to the cutting reels. This geometry of this square-ball connection at either end of intermediate shaft 94 permits the reel shaft of mower units 200 and 201 to be continuously driven, even though there is considerable relative vertical movement of reel mower units 200 and 201. In this respect, it should be noted that the horizontal pivotal axis of each square-ball, e.g. the square-ball at the left end of mower unit 200, lies in direct alignment with the horizontal axis on which the corresponding mower-unit pivots with respect to its side hitch.

I have found that by constructing square-ball 98 out of nylon, and by properly sizing this element with respect to socket 95, a trouble-free universal joint operation is achieved in a simple and inexpensive manner, with a substantial minimizing of maintenance expenses. In FIG. 6, these elements are shown in cross-section, and the wide range of vertical flexibility is shown. Also in FIG. 6, I have shown two washers 96 on either side of a compressible rubber washer 97, these washers being effective to permit shaft 94 to fit snugly between the square-ball at either end thereof.

While there has been described what is at present considered to be the preferred embodiment of this invention, it will be obvious to those skilled in-the-art that various changes and modifications may be made therein without departing from the invention and it is, therefore, aimed in the appended claims to cover all such modifications as fall within the true spirit and scope of the invention.

What is claimed is:

1. A reversible transmission comprising:
a driving pulley and a driven pulley rotatable on spaced parallel axes of rotation,
a drive belt surrounding said pulleys, and
means for moving said pulleys into engagement with each other whereby said belt is in slack non-driving status and said driving pulley drives said driven pulley in one direction through its direct contact therewith and for moving said pulleys out of engagement and into belt tensioning position in which said driven pulley is driven in the reverse direction, and
wherein the driving pulley is mounted on a first shaft driven by an engine,
the driven pulley is mounted on a second shaft carried by an arm pivoted about an axis parallel to and spaced from the second shaft,
said means for moving said pulleys including said arm and
means for pivoting said arm about said axis to move the driven pulley on its shaft between the two said dispositions thereof relative to the driving pulley, and
wherein the arm is pivoted about a rotatable third shaft parallel to and spaced from the second shaft,
the driven pulley being drivingly connected to the rotatable shaft,
wherein said means for pivoting said arm is linked to said arm in a manner which provides an over center reaction between said arm and said means when said driven pulley is in one of said dispositions,
said over-center reaction maintaining said driven pulley in said one disposition, and
wherein said means for pivoting said arm includes,
a pivotally mounted second arm,
said arm being shiftable between positions corresponding to said operative positions of said driven pulley,
said arm having one end thereof adapted to be manipulated by the operator to effect the shifting of said transmission,
the other end of said second arm being linked with the end of said first arm remote from the end thereof about which it pivots, and on the side of said second shaft remote from the said pivot axis, and
wherein said first and second arms are connected by linkage which provides an over center capability between the two arms when in one of said two operative positions,
said over-center capability maintaining said arms and said driven pulley in one of said operative positions, and
wherein said linkage includes a spring means.

2. The transmission of claim 1, wherein said spring means comprises an elongate helically coiled spring, one end of which is connected with one of said arms and the other of which is connected with the other of said arms.

3. A reversible transmission comprising:
a driving pulley and a driven pulley rotatable on spaced parallel axes of rotation,
a drive belt surrounding said pulleys,
and means for moving said pulleys into engagement with each other whereby said belt is in slack non-driving status and said driving pulley drives said driven pulley in one direction through its direct contact therewith and for moving said pulleys out of engagement and into belt tensioning position in which said driven pulley is driven in the reverse direction, and
wherein the driving pulley is mounted on a first shaft driven by an engine,
the driven pulley is mounted on a second shaft carried by an arm pivoted about an axis parallel to and spaced from the second shaft,
said means for moving said pulleys including said arm and
means for pivoting said arm about said axis to move the driven pulley on its shaft between the two said dispositions thereof relative to the driving pulley, and
wherein the arm is pivoted about a rotatable third shaft parallel to and spaced from the second shaft,
the driven pulley being drivingly connected to the rotatable shaft,
including a fixed sleeve, and
wherein said rotatable shaft is rotatably mounted in, and supported by, said sleeve.

4. A reversible transmission comprising:
a driving pulley and a driven pulley rotatable on spaced parallel axes of rotation,
a drive belt surrounding said pulleys, and
means for moving said pulleys into engagement with each other whereby said belt is in slack non-driving status and said driving pulley drives said driven pulley in one direction through its direct contact therewith and for moving said pulleys out of engagement and into belt tensioning position in which said driven pulley is driven in the reverse direction, and
wherein the driving pulley is mounted on a first shaft driven by an engine,
the driven pulley is mounted on a second shaft carried by an arm pivoted about an axis parallel to and spaced from the second shaft,
said means for moving said pulleys including said arm and
means for pivoting said arm about said axis to move the driven pulley on its shaft between the two said dispositions thereof relative to the driving pulley, and
wherein the arm is pivoted about a rotatable third shaft parallel to and spaced from the second shaft,
the driven pulley being drivingly connected to the rotatable shaft,
including a third driven member mounted on said first shaft and driven thereby,
a fourth driven member, and means drivingly interconnecting said third and fourth driven members,
including a fifth shaft, said fourth driven member being drivingly mounted on said fifth shaft, and
a fifth driven member mounted on said fifth shaft and driven thereby,
including a fixed sleeve, and
wherein said rotatable shaft is rotatably mounted in, and supported by, said sleeve, and
including a fourth shaft,
a first driven member mounted on said third shaft,
a second driven member mounted on said fourth shaft, and
first endless flexible drive means drivingly interconnecting said first and second driven members,
said fifth shaft being a tubular member,
said fourth shaft being rotatably mounted in said fifth shaft.

5. A reversible transmission comprising:
a driving pulley and a driven pulley rotatable on a spaced parallel axes of rotation,
a drive belt surrounding said pulleys, and
means for moving said pulleys into engagement with each other whereby said belt is in slack non-driving status and said driving pulley drives said driven pulley in one direction through its direct contact therewith and for moving said pulleys out of engagement and into belt tensioning position in which said driven pulley is driven in the reverse direction,
said driving pulley being mounted on a first shaft driven by an engine,
said driven pulley being mounted on a second shaft,
a fifth shaft,
a fourth driven member drivingly mounted on said fifth shaft,
a third driven member mounted on said first shaft and driven thereby and adapted to drive said fourth driven member,
including endless belt means drivingly interconnecting said third and fourth driven members, idler pulley means adapted to engage said belt means for tightening and slackening said belt means to selectively connect and disconnect said third and fourth driven members, and lever means manually operable by an operator and operatively connected to said idler pulley for moving same between said connect and disconnect positions with respect to said belt.

6. The transmission of claim 5, including link means interconnecting said lever means and said idler pulley;

said lever means being adapted to be held in at least one of said positions by an over center relationship between said lever and linkage.

7. The transmission of claim 6, wherein said linkage includes an elongate helically coiled spring, one end of which is interconnected with said lever means, and the other end of which is interconnected with said idler pulley.

* * * * *